June 1, 1926.

F. J. CLARK

PRESSING IMPLEMENT

Filed August 22, 1923

INVENTOR.
Frederick J. Clark,
by Parker & Bochnow,
ATTORNEYS.

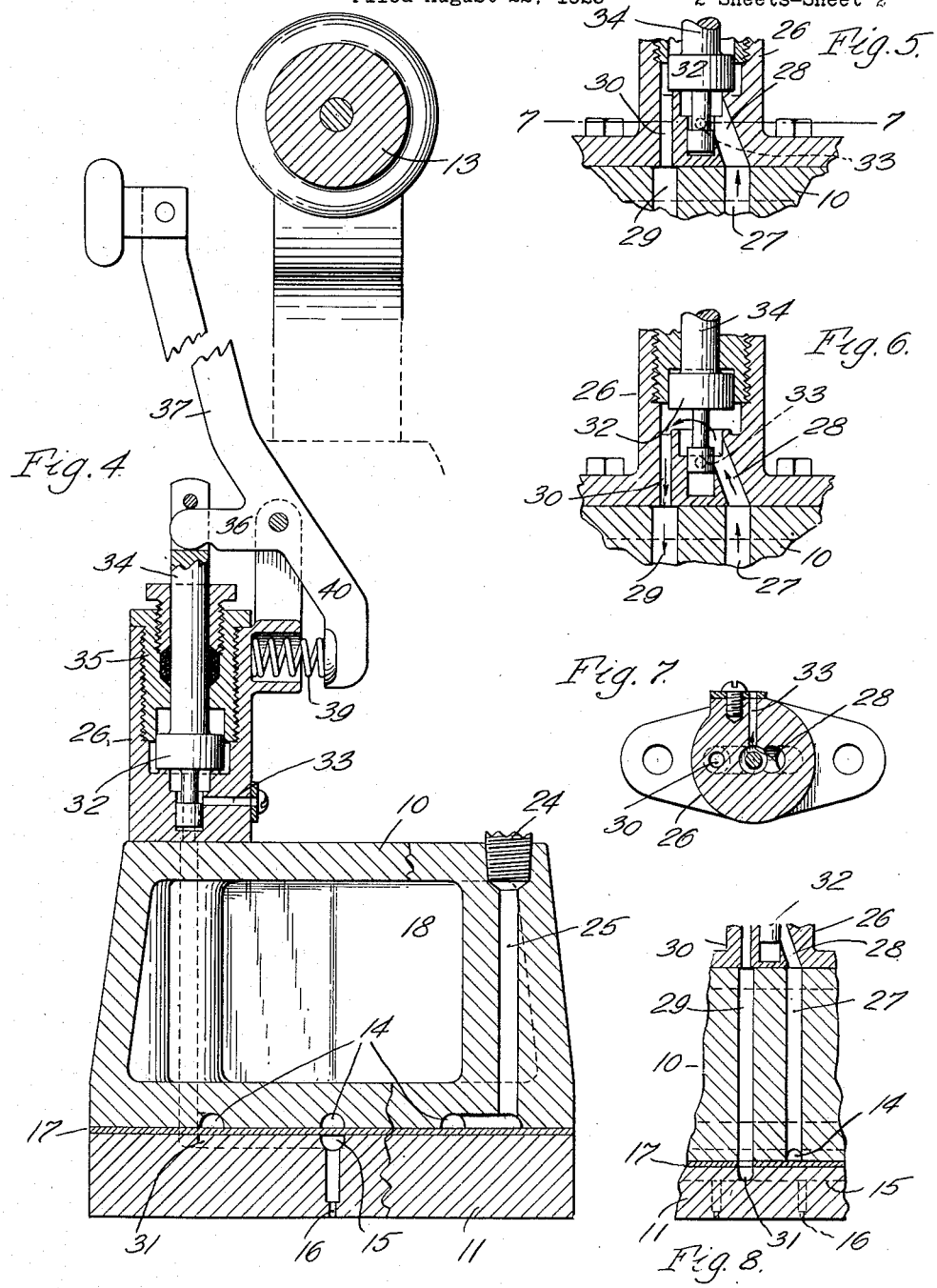

Patented June 1, 1926.

1,586,611

UNITED STATES PATENT OFFICE.

FREDERICK J. CLARK, OF BUFFALO, NEW YORK, ASSIGNOR TO STEAM PRESSING IRON COMPANY, OF CHICAGO, ILLINOIS.

PRESSING IMPLEMENT.

Application filed August 22, 1923. Serial No. 658,721.

This invention relates to pressing irons or implements of that kind which are provided with means for discharging a suitable fluid, such as steam, preferably through perforations in the pressing face of the iron or implement, for moistening the goods while they are being pressed.

In some irons or implements of this character, steam for moistening the goods is supplied to the implement from some suitable source outside of the iron or implement, and in other irons or implements, water is supplied to the implement which is provided with a heated chamber in which the water is converted into steam, the latter being discharged under control from the implement for moistening the goods being pressed. It is important in such pressing devices, especially when pressing some kinds of goods, to superheat or dry the steam, whether it be supplied to or generated in the implement, before it is discharged to the goods, in order to insure that no water will discharge from the implement and come in contact with the goods, as this may result in spotting or ruining the goods.

One object of this invention is to improve pressing irons or implements of the character mentioned so as to produce an implement of practical, desirable and simple construction which can be readily produced at the minimum cost and with the minimum loss or scrapping of parts due to imperfections in their manufacture.

Other objects are to produce an iron or implement of simple construction provided with a heating chamber or passage and discharge passages for the moistening fluid or steam, which are constructed and arranged so as to insure adequate heating of the steam, and which are readily accessible so that any scale and rust from pipes, pieces of rubber from the fluid supply hose, or other foreign matter, can be easily removed and prevented from clogging the passages and interfering with the superheating or discharge of the steam to the goods; and also to simplify and improve pressing irons or implements of the character mentioned in the other respects hereinafter described and set forth in the claims.

In the accompanying drawings:

Fig. 4 is a transverse sectional elevation thereof, on an enlarged scale, on line 4—4, Fig. 1.

Figs. 5 and 6 are similar sections of the steam discharge or controlling valve, showing different positions thereof.

Fig. 7 is a horizontal section thereof on line 7—7, Fig. 5.

Fig. 8 is a section of the iron, on line 8—8, Fig. 2.

The invention is herein shown and described in connection with a movable machine iron which is adapted to be moved by hand over the goods when pressing the same. The invention, however, is not necessarily restricted to a portable or hand iron, but is also applicable to pressing machines in which the pressing implement having the means for moistening the goods forms a connected part, whether movable or not, of a pressing machine.

The iron or implement comprises a hollow body or portion 10 forming a chamber for a heating element, and a base or bottom plate 11, which is removably secured to the hollow body 10. Preferably these two parts are connnected by a plurality of screw studs 12 which are fixed in the bottom plate, pass through holes in the lower peripheral part of the hollow body 10, and are furnished with nuts 12$^a$ located in vertical recesses 12$^b$ in the side walls of the hollow body 10. By this formation of the body 10, short studs can be employed, and it is not necessary to drill long holes through the comparatively deep body 10 for the studs, and injury to the fastenings by the expansion of the iron is eliminated.

13 represents a handle of any usual or suitable construction by means of which the implement can be lifted and moved about.

Figure 1:
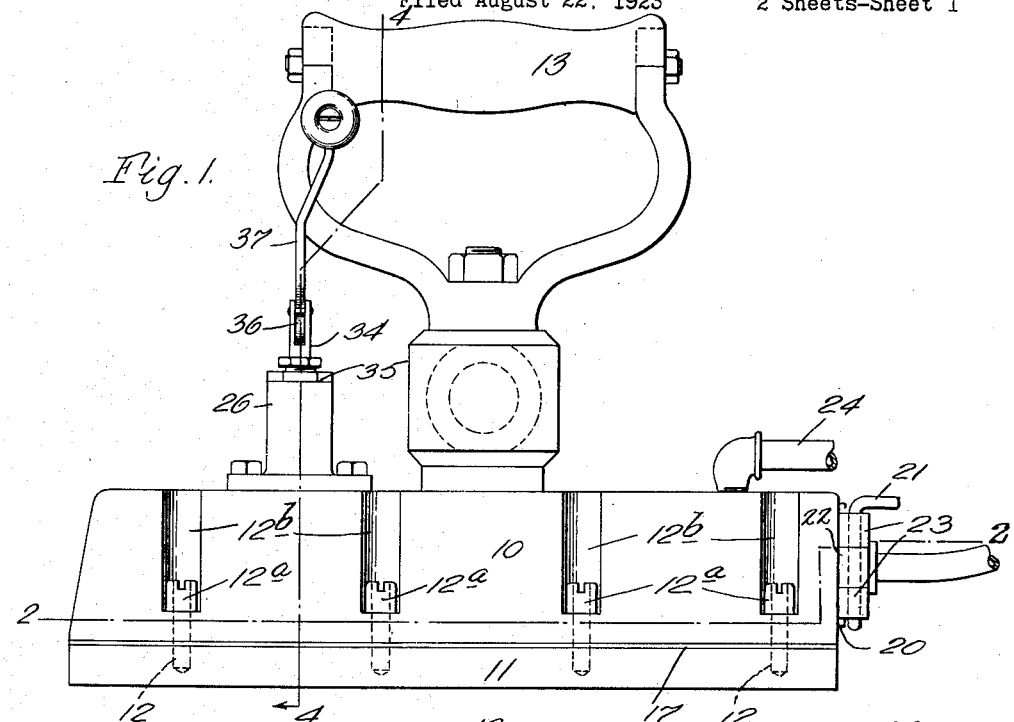
Fig. 1 is a side elevation of a pressing iron or implement embodying my invention.
Figure 2:
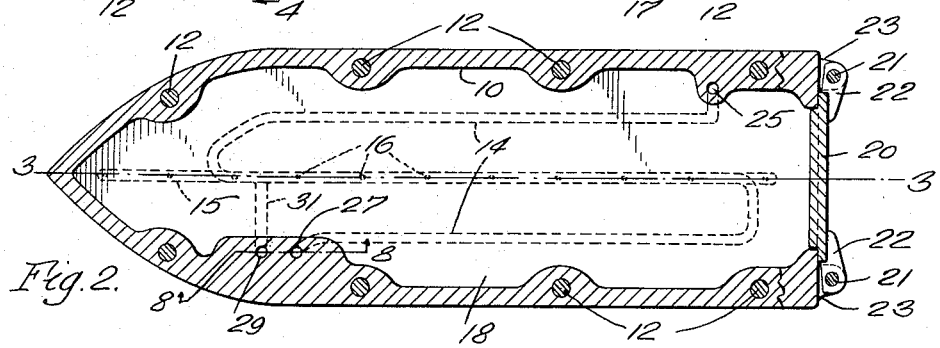
Fig. 2 is a sectional plan view thereof on line 2—2, Fig. 1.
Figure 3:
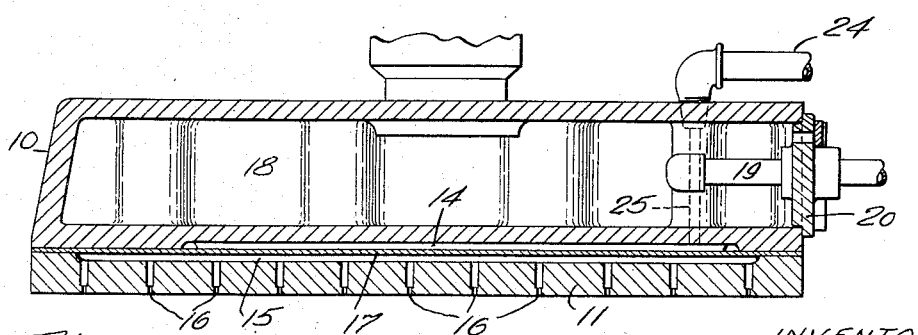
Fig. 3 is a longitudinal sectional elevation thereof on line 3—3, Fig. 2.

The hollow body 10 has formed in the bottom face thereof a groove or channel 14 for heating the moistening fluid or steam before it is discharged to the goods being pressed, and the base plate 11 is provided in its upper face with one or more grooves or channels 15 by which the heated fluid is delivered to small discharge perforations 16 extending through the bottom or pressing face of the iron. Preferably the iron or implement is heated by a gas burner or other suitable heating element housed within the chamber 18 in the hollow body 10 and low pressure steam is supplied from a suitable outside source to the passage 14 in which it is superheated and dried by heat from the heating element before it passes to the discharge passage 15. If desired, however, water could be supplied to the passage 14 and heated therein to generate the steam for use in moistening the goods being pressed. The channels 14 and 15 in the body portion 10 and base plate 11 are separated so as to form separate and distinct chambers or passages, by a thin plate 17, preferably of copper, which is firmly clamped between the body 10 and base plate by the screws connecting these parts. This plate constitues a gasket which forms a steam tight joint between the body portion and the base plate and prevents the escape of steam, and also prevents direct communication between the heating passage 14 above the plate and the discharge passage 15 below the plate. By reason of this construction, the channels or passages 14 and 15 can be readily machined or molded in the faces of the body portion 10 and base plate 11. This avoids the necessity for drilling the passages, which is a slow and expensive operation, or of coring the passages, which, because of the long narrow shape thereof, results in many imperfect castings which have to be discarded and therefore greatly increase the cost of production of the irons. Furthermore, the parts can be readily separated and both the heating and discharge passages exposed, simply by removing the one set of nuts 12ª, thereby affording access to the channels or passages so that they can be easily cleaned out and prevented from becoming clogged. The passage 14 should be long enough to make certain that the fluid in passing through the same will attain the required temperature. In order to secure the necessary length of the passage within the dimensions of the iron or implement, it is preferably made of the tortuous form shown in Fig. 2. Since this passage is formed in the face of the body portion 10, it can be readily made of this tortuous shape and of small cross section, giving the required length of passage for heating the fluid, and since the base plate 11 and the separating plate 17 can be readily removed, the passage can be readily scraped or cleaned to remove any foreign matter therefrom.

A gas burner 19 of usual type is shown for heating the iron and the moistening fluid, but any other suitable heating device could be employed. This burner or heating element is preferably carried by a support or plate 20 secured to the rear end of the iron so as to close the end of the heater chamber 18, and in order to enable the heater to be readily removed for cleaning the same or renewing the parts thereof, the supporting plate 20 is preferably removably secured in place on the iron by pins 21 which pass through registering holes in lugs 22 on the plate 20 and lugs 23 projecting from the end of the iron. Therefore, to secure the burner or heater in place and remove it, it is only necessary to insert or remove the pins 21, which are preferably made with bent upper ends or handles. This construction enables the burner or heater to be secured in place and removed with much less trouble than is incident to a screw connection, and it is not necessary to use any tool or implement for removing and securing the burner or heater in place. The burnt gases escape from the heating chamber, as usual, through a suitable vent hole, not shown.

The steam or moistening fluid is supplied to the iron through a flexible pipe or hose 24 which is secured to the hollow body 10 of the iron and communicates with a passage 25, preferably a straight vertical hole, in the body 10, leading to the heating passage 14. The flow of steam through the heating passage 14 and discharge passage 15 in the bottom plate 11 is controlled by a suitable valve adapted to be actuated by hand so as to control at will the discharge of the steam from the perforations in the pressing face of the iron. In the construction shown, this valve is arranged in a valve casing or housing 26 bolted or otherwise removably secured on top of the hollow body 10 of the iron, and connects by passages in the iron with the heating passage 14 and the discharge passage 15. Preferably, the hollow body 10 of the iron is provided with a passage 27 which extends vertically through the body portion from top to bottom thereof and connects at its lower end with one end of the heating passage 14, and at its upper end with a passage 28 in the valve casing 26. A second passage 29 extends vertically through the hollow body 10 of the iron from top to bottom thereof and connects at its upper end with a passage 30 in the valve casing and at its lower end with a groove 31 in the bottom plate of the iron leading to the discharge passage 15. The valve, which is preferably a piston valve 32 arranged to slide vertically in a suitable chamber in the valve casing 26, controls communication between the passages 28 and 30 in the valve casing. In the position of the valve shown in Fig. 5, it cuts off communication between the passage 28 and the passage 30, thereby preventing the steam from flowing from the heating passage 14 to the discharge passage 15, and in the position of the valve shown in Fig. 6, it opens communication between these passages to permit the flow of the steam from the heating chamber and the discharge thereof through the perforations in the bottom of the iron. Preferably the valve casing is provided with a small bleeder or vent passage 33 which connects with the passage 28 below the valve when the latter is in its lower position. In this position of the valve, therefore, in which it prevents flow of steam from the heating passage 14 to the discharge passage 15, the heating passage 14 communicates with the vent passage 33 so that, when the valve is closed to prevent discharge of the steam from the moistening perforations, the heating passage is vented through the passages 27, 28 and 33 and this insures a circulation of the steam through the heating passage at all times and prevents possible condensation of water in the iron and also prevents a possible abnormal pressure in the heating chamber.

The valve can be actuated by any suitable means. As shown, it is provided with a stem 34 extending vertical'y upwardly through a suitable stuffing box 35 in the upper end of the valve casing, and is engaged by an arm 36 of an actuating lever 37 which is suitably pivoted on the valve casing and is provided with an upwardly extending arm provided with a thumb piece located adjacent to the handle 13 of the iron, where it can be readily actuated by the thumb or finger of the hand grasping the handle of the iron. The valve is normally moved to and held in its closed position by a suitable spring 39 which, as shown, is a coil spring confined in a spring pocket on one side of the valve casing and engaging a downwardly extending arm 40 of the actuating lever.

Inasmuch as the passages 27 and 29 are straight and extend completely through the body 10 of the iron, they can be readily cleaned out whenever necessary by passing a suitable cleaning device through the passages after first removing the bottom plate 11 and the valve case, both of which can be quickly removed by unscrewing their securing screws. As the valve and its actuating means are mounted on and carried by the valve casing, the whole valve mechanism constitutes a separable unit which can be removed and replaced without disturbing the relation of the valve and its actuating means. Then, too, when the valve unit is removed, its passages and the valve are readily accessible for cleaning and the repair or replacement of the parts.

I claim as my invention:

1. In a pressing implement, the combination of a pressing body comprising separable portions having opposed grooved faces, a plate removably secured between and cooperating with said grooved faces to form separate fluid heating and discharge passages at opposite sides of said plate, said passages being connected, means for heating fluid in said heating passage, and means for controlling the discharge of fluid from said discharge passage.

2. In a pressing implement, the combination of a pressing body comprising separable portions having opposed grooved faces, a plate removably secured between and cooperating with said grooved faces to form separate fluid heating and discharge passages at opposite sides of said plate, means for heating fluid in said heating passage, and a controlling device and connections for admitting the heated fluid at will from said heating passage to said discharge passage.

3. In a pressing implement, the combination of a pressing body comprising separable portions having opposed grooved faces, a plate gasket removably secured between and cooperating with said grooved faces to form separate fluid heating and discharge passages at opposite sides of said plate gasket and to form a steam tight joint between said faces, means for heating fluid in said heating passage, and a manually controlled valve and connections for admitting the heated fluid from said heating passage to said discharge passage.

4. In a pressing implement, the combination of a hollow body and a separable pressing plate having opposed grooved faces, said pressing plate having discharge perforations through its pressing face communicating with the groove in said plate, a plate removably secured between and cooperating with said grooved faces to form separate fluid heating and discharge passages at opposite sides of said plate, a heating element in said hollow body for heating fluid in said heating passage, and means for enabling the heated fluid to be discharged at will from said discharge perforations.

5. In a pressing implement, the combination of a hollow body and a separable pressing plate having opposed grooved faces, said pressing plate having discharge perforations through its pressing face communicating with the groove in said plate, a plate removably secured between and cooperating with said grooved faces to form separate fluid heating and discharge passages at opposite sides of said last named plate, a heating element in said hollow body for heating fluid in said heating passage, and a valve controlling communication between said heating and discharge passages and adapted to be actuated to admit heated fluid from the heating passage to the discharge passage.

6. In a pressing implement, the combination of a pressing body comprising separable portions having opposed grooved faces, a plate interposed between and cooperating with said grooved faces to form separate fluid heating and discharge passages at opposite sides of said plate, screw fastenings detachably securing said separable portions and plate together whereby they can be separated to expose said grooves, means for heating fluid in said heating passage, and means for controlling the discharge of fluid from said discharge passage.

7. In a pressing implement, the combination of a pressing body comprising separable portions having opposed grooved faces, a plate removably secured between and cooperating with said grooved faces to form separate fluid heating and discharge passages at opposite sides of said plate, two passages extending completely through one of said body portions and connecting respectively with said heating and discharge passages, means for heating fluid in said heating passage, and means controlling communication between said through passages for admitting the heated fluid from said heating passage to said discharge passage.

8. In a pressing implement, the combination of a pressing body comprising separable portions having opposed grooved faces, a plate removably secured between and cooperating with said grooved faces to form separate fluid heating and discharge passages at opposite sides of said plate, a valve casing removably secured on one of said body portions, two passages extending completely through said last-mentioned body portion from said valve casing respectively to said heating and discharge passages, means for heating fluid in said heating passage, and a valve in said valve casing adapted to open and close communication between said through passages.

9. In a pressing implement, the combination of a chambered body, a heating element, a support carrying said heating element, said body having a seat in which said support is removably seated for holding said heating element in operative relation in said chamber, said body and support having parts provided with registering holes, and pins slidably engaging in said registering holes for removably securing the support in place in said seat, said pins being removable to permit removal of said support and heating element.

FREDERICK J. CLARK.